Patented Nov. 18, 1952

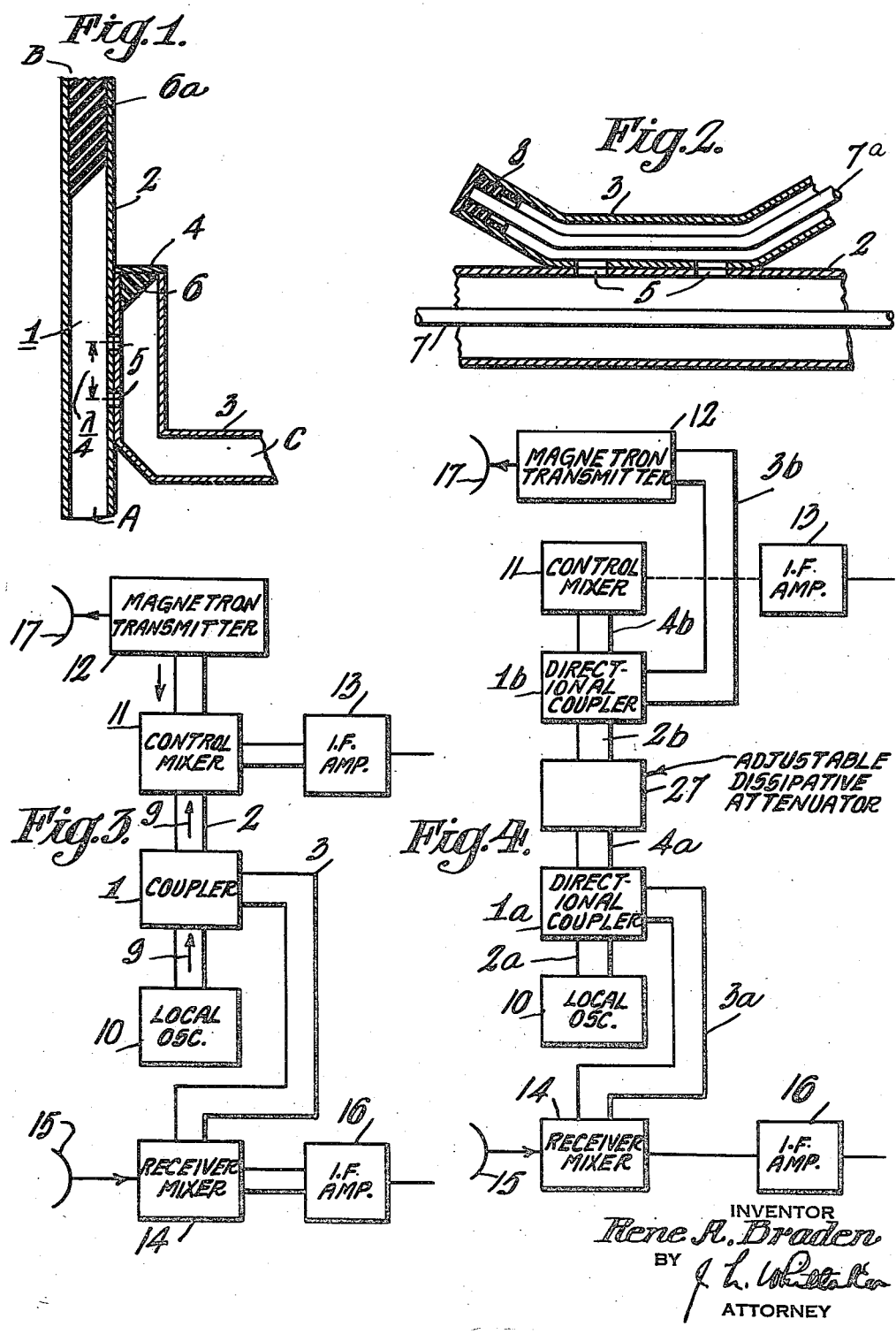

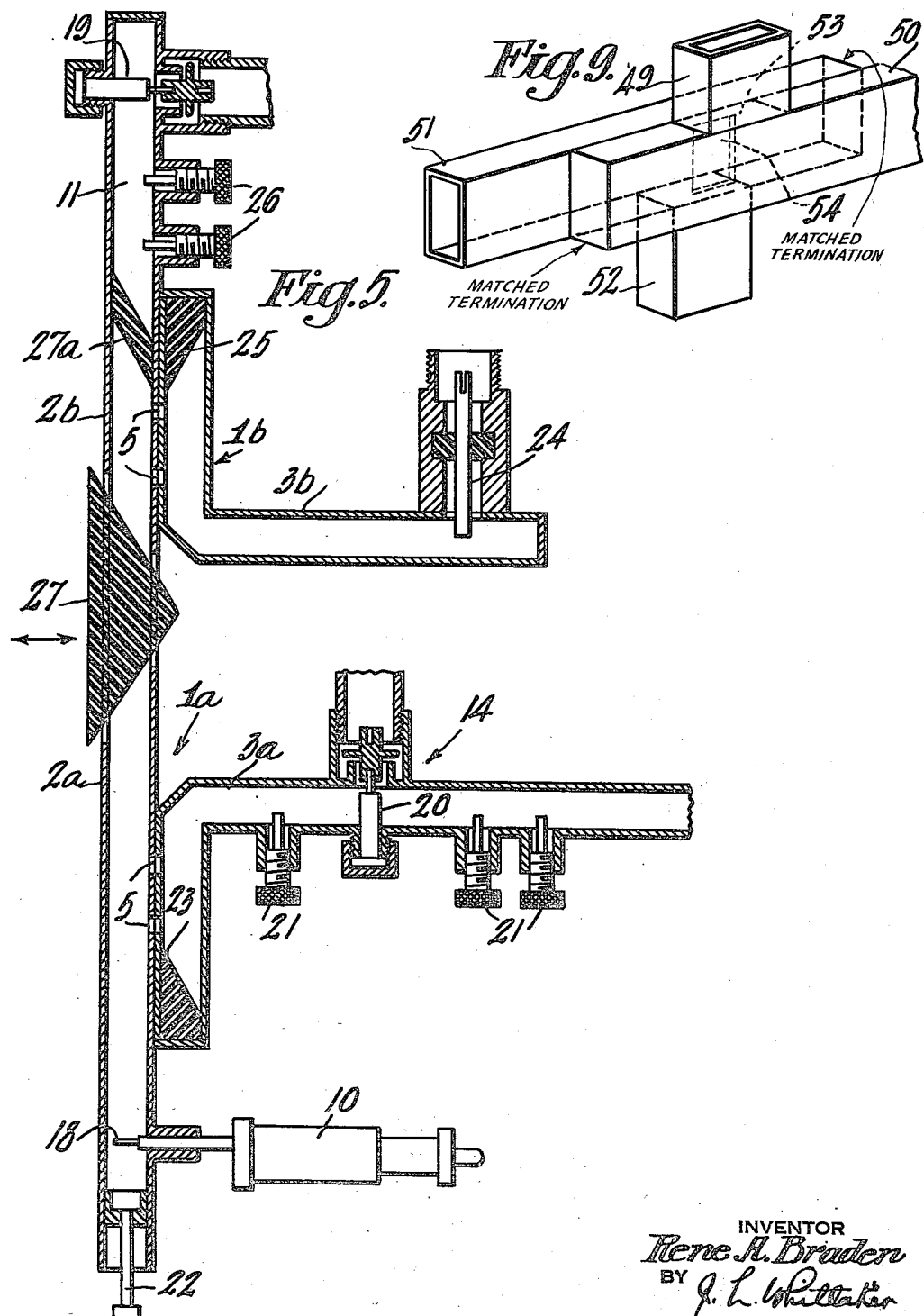

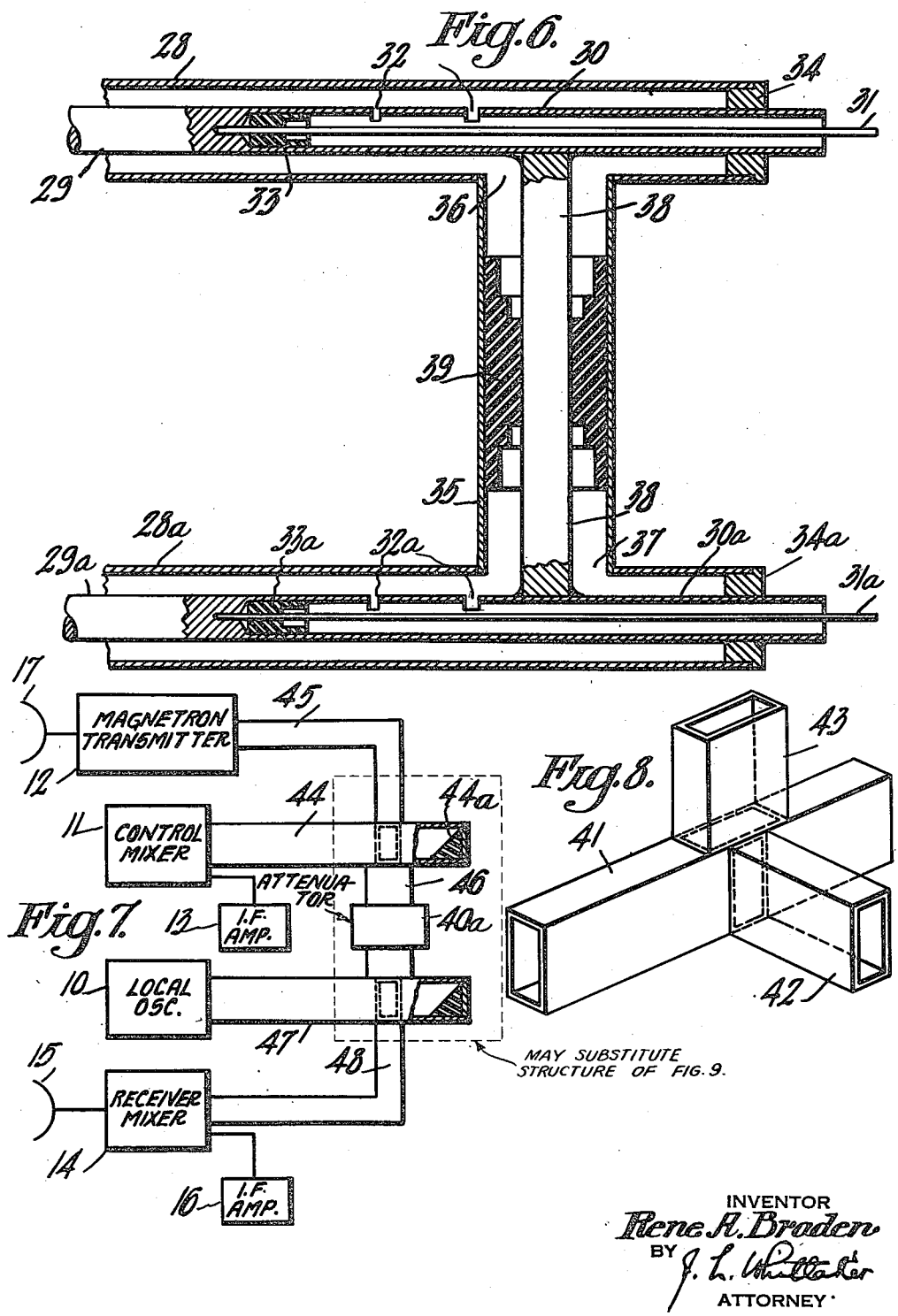

2,618,744

UNITED STATES PATENT OFFICE 2,618,744

FREQUENCY MODULATION RADAR SYSTEMS WITH DIRECTIONAL COUPLERS OR THE LIKE

Rene A. Braden, Hopewell, N. J., assignor to Radio Corporation of America, a corporation of Delaware Application April 30, 1949, Serial No. 90,624

19 Claims. (Cl. 250—13)

My invention relates generally to radar systems and more particularly to the elimination of cross coupling between the various component parts of such systems.

In frequency modulated (FM) radar systems, there are transmitted groups of radio waves that are frequency modulated at a periodic rate by a sine wave or by a linear wave current such as from a sawtooth or triangular wave generator. These modulated waves are received after reflection back from a target or reflecting surface and the received signal is applied to a mixer to which also is applied an FM signal direct from the transmitter. There appears in the output of the mixer a beat-frequency signal or, in the case of a superheterodyne circuit, an intermediate frequency (I. F.) signal carrying the beat-frequency signal. The frequency of the beat-frequency signal is a function of the target range or the distance between the system and the reflecting surface. A system of this type, without superheterodyning, is described in U. S. patent to Bentley, 2,011,392, issued August 13, 1935.

The present invention will be described with specific reference to a system employing superheterodyne circuits, such as is described and claimed in application Serial No. 508,031, now Patent No. 2,424,796, issued July 29, 1947, filed on October 28, 1943 in the name of Wendell L. Carlson and entitled Superheterodyne Radio Altimeter or Locator, and in application Serial No. 718,915, now Patent No. 2,540,506, issued February 6, 1951, filed on December 28, 1946, in the name of Rene A. Braden and entitled Radar Systems of Superheterodyne FM Type.

It has been found, particularly when employing very high frequencies, that in systems of the type referred to herein, there is considerable difficulty in obtaining the desired results because of amplitude modulation effects that may result either from amplitude or frequency modulation of the transmitter oscillator. This difficulty is caused largely by cross-feed or cross-coupling of signals from the transmitter portion of the system to the receiver portion of the system. There are two cross-feed paths, one being a radiation leakage path from the transmitter antenna to the receiving antenna, which is present regardless of the use of sharply directive antennas, shielding, etc. The other cross-feed path is through the cables and electrical apparatus interconnecting the transmitter and receiver.

Unless special precautions are taken, the effect of the two cross-feed or cross-coupling signals is to introduce an amplitude modulation signal in the signal output of the system which may be of sufficient magnitude to mask out the desired output signal resulting from the signals reflected from a target. Such difficulty is encountered particularly where the transmitter oscillator is a magnetron because a magnetron is subject to both amplitude and frequency modulation caused by ripples in the anode voltage supply, by variations in intensity of the applied magnetic field, by the magnetic field set up by alternating currents in the cathode heater, by fluctuations in the cooling air blast, and by mechanical vibration of the magnetron. The cross-coupling currents are usually much stronger than the normal received signal currents and for this reason are very troublesome, if they are noise or ripple modulated, for example. As will be pointed out hereinafter, any spurious frequency modulation such as mentioned hereinbefore shows up eventually as the equivalent of an amplitude modulation and may be more troublesome than an actual amplitude modulation.

The principal object of the present invention is to provide an improved method of and apparatus for the minimizing of the effects of cross-coupling currents in an FM radar system.

A further object of the invention is to provide a wave guide system for coupling the various circuits of an FM radar system, with the minimum cross-coupling effects between the transmitter and the receiver.

Accordingly, the main feature of the invention is to apply a source of local oscillations to a control frequency mixer and to a receiver mixer to obtain two I. F. currents, the beat frequency of the two I. F. currents being a measure of the distance from the system to the reflecting surface, and at the same time isolate the transmitter from the receiver.

The invention will be better understood from the following description taken in connection with accompanying drawings in which:

Figure 1 is a sketch in cross section of a directional hollow wave guide coupler;

Figure 2 is a sketch in cross section of a directional coaxial cable coupler;

Figure 3 is a block diagram illustrating one embodiment of the invention using one directional wave guide coupler;

Figure 4 is a block diagram illustrating another embodiment of the invention using two directional wave guide couplers;

Figure 5 is a sketch in cross section of one embodiment of a wave guide system applicable to the arrangements illustrated in Figure 4;

Figure 6 is a sketch in cross section of one embodiment of a coaxial wave guide system applicable to the arrangement illustrated in Figure 4;

Figure 7 is a block diagram illustrating an embodiment of the invention in a simplified wave guide coupling system;

Figure 8 is a sketch in perspective of a single unit multiple-Tee wave guide coupler applicable to the embodiment illustrated in Figure 7; and Figure 9 is a sketch in perspective of two multiple-Tee wave guide couplers joined together.

Similar reference characters are applied to similar elements throughout this specification and accompanying drawings.

With reference to Figure 1, there is disclosed therein and generally shown as numeral 1, a conventional hollow wave guide directional coupler which consists of the main line guide 2 to which is attached the branch line guide 3, shown as a hollow guide with its upper end blocked off as at 4 and its lower or output end bent in the form of an elbow. Two field coupling holes 5 are drilled through the walls of guides 2 and 3, the distance between the holes 2 and 3 being one quarter of the wave length of the radio wave being conducted by the guides. In branch guide 3 is shown an energy absorbing and non-reflecting wedge 6 and in main guide 2 is shown an energy absorbing and non-reflecting attenuator 6a. The wedge 6 and attenuator 6a are made of some radio energy absorbing material, as for example, Bakelite, or rubber filled with finely divided conducting material.

Figure 1 illustrates one of a number of types of directional couplers, any of which types may be used in the circuits to be described.

In Figure 2 is shown a directional coaxial guide coupler consisting of the main line guide 2 with its inner conductor 7 and branch line guide 3 and its inner conductor 7a. Holes 5 are drilled through guides 2 and 3 a distance apart equal to one quarter of the wave length of the radio wave being conducted by the guides. At the closed end of branch 3 is inserted an absorbing plug 8.

It is known that when a directional coupler such as is shown in Figures 1 and 2 is used to couple two circuits together only a part of the energy in the main guide is transferred to the branch guide. There are three transmission paths through the coupler, each having a different insertion loss. The first path is along the main guide, from end A to end B, or vice versa, and the insertion loss in this path is very small. The second path is from end B to the side branch, end C, or vice versa, and in this path the insertion loss has an intermediate value. The third path is from end A to end C, or vice versa, and in this path the insertion loss is very large. The following values are typical of the losses in directional couplers. In the direct path (A to B) the insertion loss is one decibel or less. In the second path (B to C) the insertion loss depends on the design, 10 to 15 decibels being about the minimum practicable value, 20 to 30 decibels the usual range. In the third path (A to C) the insertion loss is usually 20 to 40 decibels greater than the insertion loss in the second path, the value thus being 30 to 70 decibels. In applying a directional coupler to the FM radar system, the problem is to place it in the circuit in such an oriented position with respect to the power flow that the desired energy transmissions take place in the two preferred directions, while the unwanted cross-coupling can only occur through the high-insertion-loss direction.

In the present invention, the physical characteristics of directional couplers are applied to reduce the cross-feeding of energy from an FM modulated radar transmitter to the receiver, both the transmitter and the receiver by necessity of of operation being connected to a single local oscillator.

With reference to Figure 3, 9 represents a conventional line guide of high frequency energy, 10 is a local oscillator connected by guide 9 to control mixer 11, which is also connected to transmitter-oscillator or magnetron 12 to produce an I. F. current to be applied to I. F. amplifier 13. Local oscillator 10 is also connected to signal mixer 14, that is also connected to receiver antenna 15. The output of mixer 14 is applied to I. F. amplifier 16. The outputs of amplifiers 13 and 16 are connected to a second detector or a balanced mixer, such as disclosed and claimed in the Braden application Serial No. 718,915, hereinbefore mentioned, the output of said detector or mixer being a measure of the distance of the target from the transmitter antenna 17.

Between oscillator 10 and mixers 11 and 14 is connected a directional coupler 1 (see Figures 1 and 2), such that the main guide 2 connects oscillator 10 directly to mixer 11 and through coupling holes 5 to the branch guide 3 to receiver mixer 14. It will be apparent from the description of the characteristics of coupler shown generally at 1 and described hereinbefore in connection with Figure 1, that the major portion of the energy from oscillator 10 will be transmitted to control mixer 11, a smaller portion to receiver mixer 14, and practically no cross-coupling current will flow from magnetron 12 through control mixer 11 to receiver mixer 14. While less energy from oscillator 10 is delivered to receiver mixer 14 than to control mixer 11, sufficient energy is delivered to receiver mixer 14 to beat with the energy received by antenna 15. The excess energy flowing toward 11 is absorbed in the adjustable attenuator indicated at 6a in Figure 1, which is placed between 1 and 11.

The arrangements shown in Figure 4 are similar to those in Figure 3, except that two directional couplers are used. Receiver mixer 14 is connected to local oscillator 10 through branch guide 3a and main guide 2a; control mixer 11 is connected to oscillator 10 through main guide 2a and 4a of coupler 1a and through main guide 2b and 4b of coupler 1b. Magnetron 12 is connected to coupler 1b through branch guide 3b of coupler 1b. It will be noted that power flows from the local oscillator to the control mixer through the low-insertion-loss paths of the two directional couplers. To prevent excessive power input, and to adjust the power to an optimum value, the adjustable attenuator 27 is inserted between the two directional couplers.

The directional coupler 1a is oriented in position so that its intermediate value of insertion loss is effective in the path between the local oscillator and the receiver mixer, and by suitable design this circuit will limit the power flowing to the mixer to a suitable value, which may be in the order of 1 or 2% of the total power generated.

The directional coupler 1b is similarly oriented with respect to power flow from the magnetron to the control mixer 11, and the insertion loss in this direction likewise limits the power flow from the magnetron to the control mixer.

Additional control may be had in either circuit by inserting an adjustable attenuator in the lines 3a and 3b, if desired.

It will be seen that power flowing from the magnetron transmitter to the receiver mixer is forced to travel through the high-insertion-loss paths of the two directional couplers in series, thus limiting this power to a very small value. Furthermore, the adjustable attenuator 27 is also in this path giving additional attenuation of the cross-coupling power.

Referring to Figure 5, there is disclosed therein in detail a wave guide system, connections and associated parts embodying the arrangements set forth in Figure 4. Local oscillator 10 is connected by conventional probe 18 to main guide 2a of coupler 1a. This main guide 2a extends to and merges into main line 2b of coupler 1b and is connected to the control mixer 11 which includes the conventional mixing crystal 19.

The output of mixing crystal 19 is connected to the control I. F. amplifier 13. One end of branch 3a of coupler 1a is connected to receiver antenna 15 and the other end is field coupled to main guide 2a through holes 5. The mixing of the currents from oscillator 10 and from the receiver antenna 15 is accomplished by the conventional mixing crystal 20, the output of which is connected to the I. F. amplifier 16. The tuning of branch guide 3a is accomplished by conventional tuning screws 21. Tuning of main guide 2 is accomplished by plunger 22. Wedge 23 is inserted at the closed end of branch 3a to absorb without reflection the energy passing through holes 5 from magnetron 12.

Branch 3b of coupler 1b is connected by conventional probe 24 to a coaxial cable leading from magnetron 12. The other end of branch guide 3b is field coupled to main guide 2b through holes 5. Wedge 25 is inserted in the closed end of branch guide 3b to absorb without reflection the energy in coupler 1b that passes beyond holes 5. Tuning of mixer 11 is accomplished by conventional tuning screws 26.

Adjustable attenuator 27 adjusts for the amount of power from local oscillator which goes into mixer 19. Attenuators 27 and 27a, respectively, are inserted in the main line 2b, between mixer 11 and coupler 1b and between the two directional couplers 1b and 1a.

The direction coupler 1b is oriented in position so that, with respect to energy entering it at the probe 24, from the transmitter oscillator 12, the direction of intermediate insertion loss is towards the control mixer 11. Most of this power goes into the control mixer and only a very small fraction of it goes towards the receiver mixer. In order to gain the greatest advantage from this condition it is desirable that the amount of power reflected from the control mixer be held to a minimum practicable amount. This condition is secured partly by adjustment of the tuning screws 26, and partly by attenuation of the reflected energy by the attenuator 27a.

The directional coupler 1a is oriented so that, with respect to the flow of power into the receiver mixer 14, the path of intermediate insertion loss is in the direction from the local oscillator. Sufficient power flows from the latter to the former to accomplish conversion of the received signals to the intermediate frequency.

As explained in connection with Figure 4, power can flow from the transmitter to the receiver mixer only by going through both directional couplers in their paths of highest insertion loss, and additionally through the attenuator 27. The amount of transmitter power which can leak into the receiver is therefore very small. The benefit derived from the use of this circuit can be evaluated by calculating the insertion loss from the control mixer to the receiver mixer. At the directional coupler 1b, the significant figure is the difference between the insertion losses of the two paths which include the branch guide. By reference to the description of Figure 1, it is seen that this may typically lie between the values 20 and 40 decibels. Attenuator 27a is small and has little effect in this calculation, but attenuator 27 may have a value between 15 and 20 decibels, in a typical system. At directional coupler 1a, the whole insertion loss is effective, and from the description of Figure 1 a typical value for this is 30 to 70 decibels. Summing the three figures, the total effective attenuation between the transmitter and the receiver is found to lie between 65 and 130 decibels. These values are considerably higher than can be gotten without the use of the directional couplers, and thus the interfering noise currents in the receiver are reduced, and the range of the system is increased.

Referring to Figure 6, a directional coupler system is shown therein consisting of a coaxial cable guide section 28 with inner conductor 29, a portion of which is hollowed out to form the guide section 30 with inner conductor 31. Slots 32, spaced apart one quarter of the wave length of the radiated energy from magnetron 12, field couples together the two coaxial guides. In the closed end of guide 30 is non-reflecting termination 33. The open end of guide 28 and conductor 29 are connected to mixer 11. The open end of guide 30 and conductor 31 are connected to magnetron 12.

A similar construction is shown in the lower half of Figure 6. Guide 28a and inner conductor 29a are connected to oscillator 10 and guide 30a and inner conductor 31a are connected to mixer 14, the two guides being field coupled together by slots 32a. The two pairs of transmission guides are connected together by coupling section 35 that opens into window 36 in guide 28 and window 37 in guide 28a.

In operation: Most of the energy from oscillator 10 passes through the main guide comprising guides 28a, 35 and 28 to mixer 11. The remainder of the energy passes through slots 32a in guide 30a and through guide 30a to mixer 14. Energy from magnetron 12 passes through guide 30, slots 32 in guide 30 to guide 28 and thence to mixer 11. Mixer 14 is isolated from magnetron 12 by the relative position of slots 32 to guide 36 and the relative direction of flow of energy from magnetron 12, by attenuator 38 and by the relative position of slots 32a to guide 36 and the relative direction of flow of energy from magnetron 12 as it enters guide 28a. 34 is a metal bushing which supports conductor 30. It also short-circuits the coaxial line 28—29, but this section of guide beyond the projecting line 38 being ¼ wavelength long, it does not affect the flow of energy along 28—29 and thence along 35—38. 34a is a similar metal bushing which supports conductor 30a. 39 is an attenuator made of an insulating material having relatively large dielectric loss. The ends are stepped, as shown, to prevent reflection of a wave impinging on it. Its purpose is to provide decoupling of the transmitter and the receiving mixer, in addition to that provided by the directional couplers and to reduce the local oscillator power reaching the control mixer to a suitable value.

Similar isolation of the transmitter component from the receiver component may be obtained while at the same time furnishing sufficient heterodyning signals from the local oscillator to both the control mixer and the signal mixer by employing the special characteristics of a multiple-Tee wave guide coupler, such as that shown in Figure 8. It is known, for example, that if radio energy is introduced into the E-plane branch 42, a satisfactory coupling into the main guide 41 of the multiple-Tee will be obtained and only an extremely small amount of the energy thus introduced into the guide will be coupled into the H-plane branch 43. Conversely, an extremely small proportion of the energy introduced in the main guide 41 by way of H-plane branch 43 will be coupled into the E-plane branch 42. This characteristic of the multiple-Tee may be employed to obtain the desired results by incorporating multiple-Tee connections between the transmitter and receiver components in the manner illustrated in Figure 7 of the drawings. The system there illustrated comprises a main guide section 44 which is connected to the control mixer 11. The E-plane branch 45 is connected to the magnetron transmitter 12, and consequently energy introduced into the branch 45 by magnetron 12 will be coupled principally into the main guide 44, dividing equally between the control mixer 11 and the matched termination 44a. A very small fraction of this energy will be coupled into the H-plane branch 46. A similar arrangement is made with respect to the local oscillator 10 and the signal mixer 14. The local oscillator is connected to the main guide section 47 of the wave guide system and the signal mixer 14 to the E-plane branch 48. Branch 49 extends to and merges with the H-plane branch 46 of the main guide 44. Preferably an adjustable dissipative attenuator 40a is included in the branches 49 and 46. This is provided for the same purpose as the attenuator 27 in Figure 4. The characteristics of the multiple-Tee are such that in a wave guide assembly thus arranged, the energy from the local oscillator 10 introduced into the guide 47 will flow to the control mixer and to the receiver mixer in approximately equal proportions. The energy introduced into the branch 45 by the magnetron oscillator 12 will pass into the guide 44 and will divide equally between mixer 11 and termination 44a and a very small fraction of the energy will be coupled into the H-plane branch 46. The arrangement of branches 45 and 46 at their junction with 44 and of branches 48 and 49 at their junction with 47 will produce high attenuation of any energy propagated by the magnetron oscillator so that no appreciable amount reaches the receiver mixer 14 from the transmitter component of the system. Thus, high attenuation of energy passing in the specified main line of the guide between the points of coupling of the branch guides into the main guide, is accomplished in much the same manner as in the guides of Figures 5 and 6. In either or both multiple-Tees, the E- and H-plane branches may be interchanged, the arrangement in Figure 7 being shown only by way of example. The amount of energy supplied by the local oscillator 10, mixers 11 and 14, and by the transmitter to mixer 11 may be controlled by adjusting the coupling of guide 47 to the local oscillator 10, and the coupling of guide 45 to the transmitter 12. Additional control can be had if desired by inserting dissipative attenuators in any of guides 44, 45, 47, and 48, but the preferred position is in guide 48, as in this position the attenuator is effective also in reducing cross coupling between the transmitter 12 and the receiver mixer 14.

Figure 9 illustrates the manner in which two multiple-Tees may be joined together to effect a similar result to that of the two Tees shown in Figure 7. The wave guide assembly illustrated in Figure 9 may be considered to be constituted of two multiple-Tees of the type illustrated in Figure 8 in which the E-plane branches of the multiple-Tees have been joined together and shortened to produce window coupling as at 54 between the main guide sections of the two multiple-Tees. In employing this arrangement, the H-plane branch 49 may be connected to the transmitter oscillator 12 and main guide section 51 connected to the local oscillator 10. The guide section 50 is connected to the control mixer and the H-plane branch 52 to the signal mixer 14. Thus arranged, the energy introduced into the H-plane branch 49 by the magnetron oscillator 12 will be coupled into the main section 50 and fed to the control mixer with very little, if any, coupling into the H-plane branch 52 leading to the signal mixer 14. Control of energy supplied to the two mixers may be effected by adjusting the coupling of guide 50 to the local oscillator and of guide 49 to the transmitter, as described in connection with Figure 7, and for additional control dissipative attenuators may be inserted in any of guides 49, 50, 51, and 52, the last being the preferred position. The two Tees in Figure 7 may be similarly combined by shortening the two H-plane branches until the two main guides are in contact, and coupled by a window.

There is thus disclosed coupling arrangements for an FM radar system in which the local oscillator is connected to the control mixer and the received signal mixer and the transmitter oscillator is connected to the control mixer with a minimum of cross-feed between the transmitter oscillator and the signal mixer, thus increasing the range of the system. In the appended claims the term directional coupler refers generically to couplers illustrated in Figure 1 and the multiple-Tee couplers in that both arrangements provide for the transfer of energy, with characteristic insertion losses, between the main guide and branches according to the directions of flow of energy.

What is claimed is:

1. An FM radar system including a transmitter oscillator, a control mixer, a local oscillator, a signal mixer, and a wave guide assembly comprising: a main guide and two branch guides, said local oscillator being connected to said main guide adjacent one end thereof, said control mixer being connected to said main guide adjacent the other end thereof, the said two branch guides being connected to said main guide by separate directional couplers, one said branch guide being connected to the said transmitter oscillator, the other said branch guide being connected to said signal mixer.

2. An FM radar system including a transmitter oscillator, a control mixer, a local oscillator, a signal mixer, and a wave guide assembly comprising: a main guide and two branch guides, said local oscillator being connected to said main guide adjacent one end thereof, said control mixer being connected to said main guide adjacent the other end thereof, the said two branch guides being connected to said main guide by separate directional couplers, one said branch guide being connected to the said transmitter oscillator, the other said branch being connected to said signal mixer, and means provided in said main guide between the said couplers for attenuating energy transferred in either direction through the said main guide.

3. An FM radar system including a transmitter oscillator, a control mixer, a local oscillator, a signal mixer, and a wave guide assembly comprising: a main guide and two branch guides, said local oscillator being connected to said main guide adjacent one end thereof, said control mixer being connected to said main guide adjacent the other end thereof, the said two branch guides being connected to said main guide by separate directional couplers, one said branch guide being connected adjacent the local oscillator and connected to the said signal mixer and the other branch guide being connected adjacent the said control mixer and connected to said transmitter oscillator.

4. An FM radar system including a transmitter oscillator, a control mixer, a local oscillator, a signal mixer, and a wave guide assembly comprising: a main guide and two branch guides, said local oscillator being connected to said main guide adjacent one end thereof, said control mixer being connected to said main guide adjacent the other end thereof, the said two branch guides being connected to said main guide by separate directional couplers, one branch being connected adjacent the local oscillator and connected to the said signal mixer, the other branch guide being connected adjacent the said control mixer and connected to said transmitter oscillator, and means provided in the main guide between the said couplers for attenuating energy transferred in either direction through the said main guide.

5. An FM radar system including a transmitter oscillator, a control mixer, a local oscillator, a signal mixer, and a wave guide assembly comprising: a main guide and two branch guides, said local oscillator being connected to said main guide adjacent one end thereof, said control mixer being connected to said main guide adjacent the other end thereof, the said two branch guides being connected to said main guide by separate directional couplers, one said branch guide being connected adjacent the said control mixer and connected to said transmitter oscillator, the said one branch guide coupler being so oriented with relation to said main guide that the direction of propagation of the greater portion of the energy transferred by the said coupler will be propagated toward the said control mixer, the other said branch guide being connected adjacent the said local oscillator and connected to said signal mixer, the said other branch guide coupler being so oriented with relation to said main guide that practically no energy from said transmitter oscillator entering said main guide through the said one branch guide coupler will be transferred from said main guide to said other branch guide.

6. The apparatus defined in claim 5 hereof, characterized by the said main guide including means between the said couplers for attenuating energy transferred in either direction through the said main guide.

7. The apparatus defined in claim 5 hereof, characterized by the said main guide including means between said control mixer and said local oscillator for attenuating energy transferred in either direction through the said main guide.

8. An FM radar system including a transmitter oscillator, a control mixer, a local oscillator, a receiver, a signal mixer, and a wave guide assembly comprising: a main guide with the said local oscillator connected thereto adjacent one end thereof and the said control mixer connected thereto adjacent the other end thereof, two directional couplers one of which is connected to said transmitter oscillator and to said main guide adjacent the control mixer end thereof and the other of which couplers is connected to the signal mixer and to the main guide adjacent the local oscillator end thereof, the said one coupler being oriented for high insertion loss with respect to the flow of energy from said transmitter oscillator into said main guide in a direction toward the other said coupler and the said other coupler being oriented for high insertion loss with respect to the flow of energy from said main guide through said other coupler to the receiver mixer, whereby energy from said transmitter oscillator to reach said receiver signal mixer must pass through both of said directional couplers in directions of large insertion losses.

9. The apparatus defined in claim 8 hereof, characterized by the said main guide including nonreflecting attenuating wedges positioned therein between said couplers and between said control mixer and its adjacent coupler.

10. An FM radar system including a transmitter oscillator, a control mixer, a local oscillator, a signal mixer, and a wave guide assembly comprising: a pair of transmission line units, each unit consisting of an outer hollow wave guide and an inner hollow wave guide, the two said guides being concentric to each other and field coupled together, one of said guides of the first said unit being connected to said transmitter oscillator and the other said guide of the first said unit being connected to said control mixer, the said field coupling therebetween being positioned as between the two guides to provide intermediate insertion loss of power from said transmitter oscillator to said control mixer, one of said guides of the second said unit being connected to said local oscillator and the other of said guides of the second said unit being connected to said receiver signal mixer, the said field coupling between the guides of the second said unit being positioned as between the last mentioned guides to provide for intermediate insertion loss of power in a direction from said local oscillator to said receiver signal mixer, means connecting together the outer guides of each of said units whereby power from said local oscillator is transmitted to said control mixer, and means associated with said connecting means for attenuating energy transferred in either direction through the said connecting means.

11. An FM radar system including a transmitter oscillator, a control mixer, a local oscillator, a signal mixer, and a wave guide assembly comprising: a multiple-Tee including a main wave guide open at one end and having a non-reflecting termination at the other end and including two conjugate branch wave guides, said control mixer being connected to said open end, said transmitter oscillator being connected to one of said branch guides, a second multiple-Tee also including a main wave guide open at one end and having a non-reflecting termination at the other end and including two conjugate branch wave guides, said local oscillator being connected to the open end of the main guide of the second multiple-Tee, one of the conjugate branch guides of the second multiple-Tee being connected to said signal mixer, and the remaining branch guides of the two multiple-Tees being connected together.

12. The invention according to claim 11 wherein the length of said two coupled branch guides is reduced to zero.

13. The invention according to claim 11 wherein means is provided in said two coupled branch guides for attenuating energy transferred in either direction through said two coupled guides.

14. An FM radar system including a transmitter oscillator, a control mixer, a local oscillator, a signal mixer and a wave guide assembly comprising: a main guide consisting of two parallel rectangular wave guides in contact along their wide faces, and coupled together by a window through said wide faces, a first branch guide Tee-coupled to one of said parallel guides through a second window in the narrow face of said guide, a second branch guide Tee-coupled to the other of said parallel guides through a third window in the narrow face of said guide, diagonally opposite from said second window, said Tee-couplers and said windows lying in a plane perpendicular to the axis of said parallel guides.

15. An FM radar system comprising a local oscillator connected to a control mixer through a main transmission path, two branch transmission paths going into said main transmission path, coupler means in said main path that is selective with respect to the direction of energy flow, one of said branch paths going into said main path by way of said coupler, a transmitter oscillator connected to feed into the branch path that is adjacent the control mixer end of the main guide, and a receiver signal mixer connected to receive signal from the branch path that is adjacent the local oscillator end of said main path, said coupler being oriented so that its path of maximum transmission loss is in the transmission circuit from one branch path to the other branch path.

16. An FM radar system comprising a local oscillator connected to a control mixer through a main transmission path, two branch transmission paths going into said main transmission path, coupler means in said main path that is selective with respect to the direction of energy flow, one of said branch paths going into said main path by way of said coupler, a transmitter oscillator connected to feed into the branch path that is adjacent the control mixer end of the main guide, a receiver signal mixer connected to receive signal from the branch path that is adjacent the local oscillator end of said main path, said coupler being oriented so that its path of maximum transmission loss is in the transmission circuit from one branch path to the other branch path, and means in said main path between said branch paths for attenuating energy transferred in either direction through said main path.

17. An FM radar system comprising a main wave guide, a local oscillator connected at one end of said guide, a control mixer connected to the other end of said guide, two branch guides going into said main guide, a directional coupler in said main guide, one of said branch guides going into said main guide by way of said directional coupler, a transmitter oscillator connected to feed into the branch guide that is adjacent the control mixer end of the main guide, and a receiver signal mixer connected to receive signal from the branch guide that is adjacent the local oscillator end of said main guide, said directional coupler being oriented so that its path of maximum transmission loss is in the transmission circuit from one branch guide to the other branch guide.

18. In an FM radar system including a transmitter oscillator, a control mixer, a local oscillator, a signal mixer, and a main wave guide, means for connecting the local oscillator to said control mixer and to said signal mixer and for connecting said transmitter oscillator to said control mixer for minimum cross-feed between said transmitter oscillator and said signal mixer, said means comprising means connecting said local oscillator and said control mixer to the respective ends of said main wave guide, means for supplying signal from said transmitter oscillator to said control mixer, a directional coupler having a branch wave guide, means connecting said coupler to said main wave guide between said local oscillator and said control mixer the branch guide of which coupler is connected to said signal mixer, the said coupler being oriented with respect to the direction of flow of energy in said main wave guide from said transmitter oscillator so that the insertion loss of said energy into said branch is large.

19. An FM radar system including a transmitter oscillator, a control mixer, a local oscillator, a signal mixer and a wave guide assembly comprising: a main guide consisting of two parallel rectangular wave guides in contact along their narrow faces, and coupled together by a window through said wide faces, a first branch guide Tee-coupled to one of said parallel guides through a second window in the wide face of said guide, a second branch guide Tee-coupled to the other of said parallel guides through a third window in the wide face of said guide, diagonally opposite from said second window, said Tee-couplers and said windows lying in a plane perpendicular to the axis of said parallel guides.

RENE A. BRADEN.

REFERENCES CITED

The following references are of record in the file of this patent:

UNITED STATES PATENTS

| Number | Name | Date |
|---|---|---|
| 2,408,791 | Magnuski | Oct. 8, 1946 |
| 2,424,796 | Carlson | July 29, 1947 |
| 2,445,445 | Marcum | July 20, 1948 |
| 2,445,895 | Tyrrell | July 27, 1948 |
| 2,460,781 | Cangelo | Feb. 1, 1949 |
| 2,462,841 | Bruck | Mar. 1, 1949 |
| 2,475,176 | Yuan | July 5, 1949 |
| 2,475,474 | Bruck | July 5, 1949 |
| 2,477,428 | Sprague et al. | July 26, 1949 |
| 2,491,540 | Wiseman | Dec. 20, 1949 |
| 2,493,801 | Bradley | Jan. 10, 1950 |